March 15, 1949.  E. DONALDSON ET AL  2,464,381

COUPLING

Filed June 12, 1947

INVENTORS,
Eames Donaldson
Walter J. Johnson
BY
Parker, Prichmov + Farmer,
Attorneys.

Patented Mar. 15, 1949

2,464,381

UNITED STATES PATENT OFFICE 2,464,381

COUPLING

Eames Donaldson and Walter J. Johnson, Buffalo, N. Y., assignors to J. H. Williams & Co., Buffalo, N. Y.

Application June 12, 1947, Serial No. 754,216

8 Claims. (Cl. 287—119)

This invention relates to couplings between relatively telescoping parts, by which the parts are held against separation by a pin disposed in aligned passages in said telescoped parts and removable endwise from the passage when the parts are to be separated.

An object of the invention is to provide an improved coupling, with which the telescoping parts may be easily coupled and uncoupled merely by inserting or removing a coupling pin; with which the coupling pin will be effectively held by friction, while in coupling position from unintentional removal; with which the cost of manufacture of the coupling will be a minimum; with which lost motion or play in the coupling will be a minimum; and which will be simple, compact and inexpensive.

Another object is to provide an improved coupling pin for uniting telescoping parts when placed in aligned passages of the assembled parts; which will frictionally remain in coupled position; which will be relatively simple, easy and inexpensive to manufacture, and strong and durable.

Other objects and advantages will be apparent from the following descrpition of some examples of the invention, and the novel features will be particularly pointed out hereinafter in connection with the appended claims.

Figure 1:
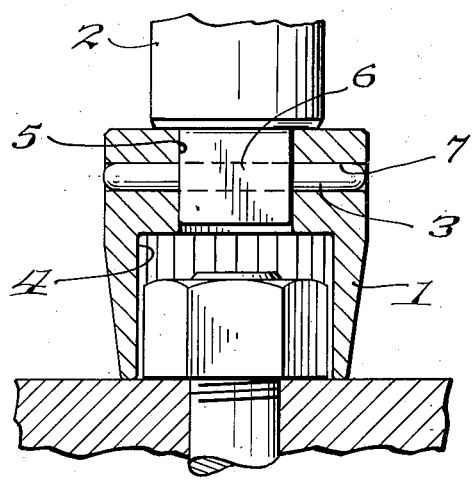
Fig. 1 is a sectional elevation of a coupling constructed in accordance with this invention, as it is applied to a socket wrench.

In the embodiment of the invention shown in Figs. 1 to 4, the coupling is between is between the telescoping parts of a socket wrench, in which any of several sockets with different sizes of nut receiving recesses are detachably coupled to an operating stem. In this example a socket member 1 is coupled to an operating stem 2 by a coupling pin 3 that is circular in transverse cross section. The socket member 1 has a non-circular, nut receiving recess 4 and one recess 5 in its opposite end face. The stem 2 has a reduced end 6 which fits the recess 5 and telescopes therewith to provide a driving connection from the stem to the socket member. To prevent unintentional separation of the stem and the socket member, the telescoping parts are provided with aligned passages forming a common cylindrical passage 7. The coupling pin 3 fits this common passage rather snugly and is inserted or removed by endwise movement along the common passage 7.

Figure 2:
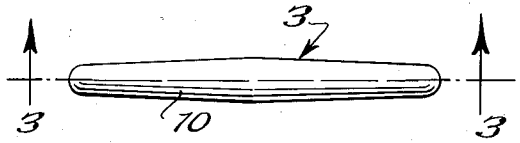
Fig. 2 is a side elevation, on a larger scale, of the coupling pin removed from the parts coupled thereby.
Figure 3:
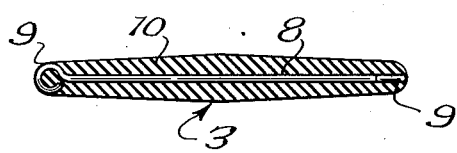
Fig. 3 is a longitudinal, sectional elevation of the pin, the section being taken approximately along the line 3—3 of Fig. 2.
Figure 4:
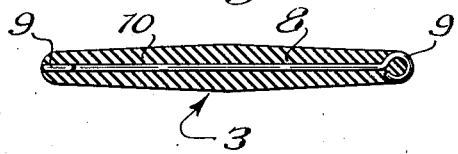
Fig. 4 is another longitudinal, sectional elevation of the same, the section being taken at approximately right angles to the section shown in Fig. 3.

The pin 3, shown separately and on a larger scale in Figs. 2 to 4, comprises a core or rod 8 of relatively rigid material, such as of metal, hard rubber, or fiber, preferably having enlargements 9 at its ends. These enlargements, in this example are circular eyes, such as may be formed by bending the ends of the rod into a closed loop or circular eye form, as shown in Figs. 3 and 4. The eyes at opposite ends are at right angles to each other, that is, the planes of the faces of the eyes, at opposite ends, if extended would be crosswise of each other. Upon this core or rod so formed, is molded and bonded a unitary body 10 of soft, compressible, distortible resilient material, such as natural rubber but preferably one of the petroleum resistant synthetic substitutes for rubber. This body 10 has its end arcuately convex, with the center of curvature of the central area of the convex ends aproximately at the center of the opening of the eye.

In making the pin 3, the core or rod 8 is prepared with its loops 9 and placed in a vulcanizing and bonding mold having a cavity of the desired, exterior dimensions and shape of the completed pin. The loops 9 are received in the concave ends of the mold without play or substantial looseness and this holds the rod 8 in the desired central position in the mold. The rubber or other material is then placed in the mold cavity around the rod, and the contents of the mold cavity then vulcanized and bonded to the core or rod in any suitable manner. The pin thus prepared preferably is thicker, crosswise, in a portion intermediate of its ends and then tapered slightly towards the ends and there merges into the partly spherical central end areas of the pin. The extreme ends of the rod 8 are preferably exposed so that a driving force may be applied thereto when forcing the pin 3 into or out of the passage 7. The maximum transverse dimension of the pin is slightly greater than the transverse dimension of the passage 7, so that the rubber or bonded compressible covering of the pin will be compressed, and some pressure will be required when forcing the pin into or out of passage 7. The friction created by forcing the pin 3 into the passage 7 will hold the pin against unintentional removal of the pin from coupling relation.

Figure 5:
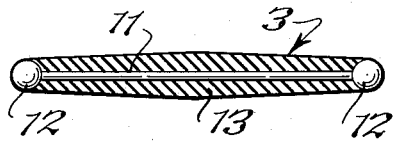
Fig. 5 is a longitudinal, sectional elevation of another coupling pin also embodying the invention but showing a slight modification of the same.

In the embodiment of the invention shown in Fig. 5, the core or rod 11, instead of having loop or eye-like ends, is provided with generally spherical or elliptical ends or heads 12 which serve the same purpose as the eyes 9 of the rod 8. Upon the rod 11 is bonded a molded body 13 of soft rubber or resilient material such as the various synthetic rubbers or rubber substitutes, and preferably one that is petroleum resistant. The pin 3 made in this manner is used in the same manner as the pin 3 illustrated in Figs. 1 to 4 and described above.

Figure 6:
Fig. 6 is a similar sectional elevation of still another modification of the invention.

In the modification shown in Fig. 6, the pin 3 has a rod 14 formed of a straight rod of hard rubber, fiber, metal or other suitable, relatively rigid material with semi-spherical or convex ends 15. Upon rod 14 is molded and bonded a body 16 of material similar to the body 10 while using the convex ends 15 to center the core or rod in the mold cavity. Otherwise this pin 3 is similar in use and construction to the corresponding pins 3 in Figs. 1 to 5.

While the loops 9, heads 12 and ends 15 preferably have their ends circular or generally spherical, it will be understood that the extreme ends of rods 8, 11 and 14 may correspond to convex, arcuate surfaces of revolution with the axis of revolution approximately along the axis of the rod. For example, the end surfaces may have a convex curvature of a paraboloid or ellipsoid or other surface of revolution, and the ends of the resilient body molded and bonded on the rod preferably merges into these convex end faces of the rod.

By the term "rubber" as used throughout the description and claims, it is intended to include within the scope of equivalents thereof, not only natural rubber but also material having similar properties such as the so-called synthetic rubbers or rubber substitutes, and since such couplings are commonly used around machines where there are oils and greases that come in contact therewith, the rubber or substitute should preferably be one of those that is affected as little as possible by petroleum or oils.

The core or rod of the coupling pin may also be of the same material as the coating but somewhat harder or more rigid, and for some purposes no core or rod reinforcement is needed, in which case the entire coupling pin is of the resilient, compressible material. The heads or enlarged ends aid in preventing the covering from being pushed or pulled from the core, and the space between the heads or enlarged ends of the core or rod is in effect a recess or annular groove on the core or rod. The heads also may be considered as forming shoulders for anchoring the encircling rubber to the core. The rubber preferably is bonded to the core, especially when the core is of metal, by methods well known in the art.

It will be understood that various changes in the details, materials, proportions and arrangements of parts, which have been herein described and illustrated in order to explain the nature of the invention, may be made by those skilled in the art within the principle and scope of the invention, as expressed in the appended claims.

We claim:

1. A coupling comprising a pair of elements having telescoping parts to be coupled, said parts having openings which, when the parts are assembled in coupled relation, are aligned and provide a common passage through said parts, a coupling pin within said passage and extending into both of said parts to couple them against separation by telescopic movement, but slidable endwise along said passage and out of it, to uncouple the parts, said pin comprising a rod of rigid material having its ends bent into eye shapes, the faces of the eyes at one end being in planes that, if extended, are crosswise of each other, and a body of resilient material molded upon said rod, extending between the outer ends of the eyes, the center of curvature of the ends being approximately at the centers of the openings of the eyes.

2. In a coupling between telescoping parts that have aligned passages, with a pin in said passages to hold said parts telescoped, that improvement in said pin which comprises a reinforcing rod of metal having an enlargement at each end, and a unitary body of petroleum resistant, resilient rubber encircling, bonded to, and fitting said rod and extending to the outer ends of said enlargements.

3. In a coupling between telescoping parts that have aligned passages, with a pin in said passages to hold said parts telescoped, that improvement in said pin which comprises a reinforcing rod of metal having an eye at each end, but with the eyes turned at different angles, and a body of petroleum resistant resilient rubber encircling, bonded to, and fitting said rod and extending to the ends of said eyes.

4. In a coupling between telescoping parts that have aligned passages, with a pin in said passages to hold said parts telescoped, that improvement in said pin which comprises a reinforcing rod of relatively rigid material having an intermediate portion of less cross section than the end portions, and a body of resilient, petroleum resistant rubber encircling, anchored to, and fitting said rod and extending into said recess, the ends of said body being convex and extending at least somewhat over the ends of said rod, and the exterior of said body being slightly tapered towards the ends from an intermediate portion of maximum diameter.

5. In a coupling between telescoping parts that have aligned passages, with a pin in said passages to hold said parts telescoped, that improvement in said pin which comprises a reinforcing rod having shoulders in the portion intermediate of its ends, and a unitary body of resilient rubber encircling said rod, from approximately end to end, and firmly secured thereon and abutting said shoulders, the maximum diameter of said body being slightly larger than the maximum diameter of the portion of the passage in which it is received, so as to be held in the passages by friction due to its compression when forced therein.

6. In a coupling between telescoping parts that have aligned openings forming a common passage through said parts, with a removable pin in said passage to prevent separation of said parts, that improvement in said pin which comprises a member of greater length than the recess in one of said parts and a maximum diameter, intermediate of its ends, slightly greater than the diameter of said passage, said member becoming progressively smaller towards at least one end from said maximum diameter and having between its ends a peripheral wall of resilient rubber.

7. In a coupling between telescoping parts that have aligned openings forming a common passage through said parts, with a removable pin in said passage to prevent separation of said parts, that improvement in said pin which comprises a member of greater length than the recess in one of said parts and a maximum diameter, intermediate of its ends, slightly greater than the diameter of said passage, said member becoming progressively smaller towards at least one end from said maximum diameter and having a core of relatively rigid material with shoulders in its peripheral wall in the portion between its ends, and an encircling wall of resilient rubber between said ends, abutting said shoulders, and firmly secured to said core.

8. In a coupling between telescoping parts that have alined passages extending crosswise of the direction of telescoping, with a pin in said passages to hold the parts together against separation in the direction in which they telescope, that improvement in said pin which comprises a member of greater length than said passage in one of the coupled parts, and a maximum diameter intermediate of its ends, slightly greater than the diameter of the corresponding part of said passage which it fits when the parts are coupled, said member converging towards its ends from its part of maximum diameter, and the peripheral surface of said part of maximum diameter being of resilient, petroleum-resistant rubber.

EAMES DONALDSON.
WALTER J. JOHNSON.

REFERENCES CITED

The following references are of record in the file of this patent:

UNITED STATES PATENTS

| Number | Name | Date |
|---|---|---|
| 2,147,163 | Jimerson | Feb. 14, 1939 |
| 2,314,085 | Gee | Mar. 16, 1943 |
| 2,326,317 | Amtsberg | Aug. 10, 1943 |

FOREIGN PATENTS

| Number | Country | Date |
|---|---|---|
| 2,236 | Great Britain | 1864 |